(12) United States Patent
Mukasa

(10) Patent No.: US 11,714,229 B2
(45) Date of Patent: Aug. 1, 2023

(54) OPTICAL FIBER AND METHOD OF MANUFACTURING OPTICAL FIBER

(71) Applicant: FURUKAWA ELECTRIC CO., LTD., Tokyo (JP)

(72) Inventor: Kazunori Mukasa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 76 days.

(21) Appl. No.: 17/393,993

(22) Filed: Aug. 4, 2021

(65) Prior Publication Data

US 2021/0364692 A1 Nov. 25, 2021

Related U.S. Application Data

(63) Continuation of application No. PCT/JP2020/002357, filed on Jan. 23, 2020.

(30) Foreign Application Priority Data

Feb. 7, 2019 (JP) ................................. 2019-020946

(51) Int. Cl.
*C03B 37/014* (2006.01)
*C03B 37/018* (2006.01)
(Continued)

(52) U.S. Cl.
CPC .......... *G02B 6/0365* (2013.01); *C03B 37/014* (2013.01); *C03B 37/018* (2013.01);
(Continued)

(58) Field of Classification Search
CPC ............ C03B 2201/12; C03B 2201/31; C03B 2203/22; G02B 6/02214; G02B 6/0365
See application file for complete search history.

(56) References Cited

U.S. PATENT DOCUMENTS

2006/0034575 A1 2/2006 Sako et al.
2006/0039665 A1* 2/2006 Matsuo .............. G02B 6/03672
385/127
(Continued)

FOREIGN PATENT DOCUMENTS

CN 104316994 A 1/2015
JP 2007-33466 A 2/2007
(Continued)

OTHER PUBLICATIONS

International Search Report dated Mar. 24, 2020 in PCT/JP2020/002357, filed on Jan. 23, 2020, 4 pages.
(Continued)

*Primary Examiner* — Ryan A Lepisto
(74) *Attorney, Agent, or Firm* — Oblon, McClelland, Maier & Neustadt, L.L.P.

(57) ABSTRACT

An optical fiber includes: a central core portion; an intermediate layer; a trench layer; and a cladding portion. Further, $\Delta 1 > \Delta 2 > \Delta 3$ and $0 > \Delta 3$ are satisfied, where $\Delta 1$ is a relative refractive-index difference of the central core portion, $\Delta 2$ is a relative refractive-index difference of the intermediate layer, and $\Delta 3$ is a relative refractive-index difference of the trench layer with respect to the cladding portion, respectively, and (c−b) is smaller than 4.5 μm when $\Delta 1$ is equal to or larger than 0.36% and equal to or smaller than 0.40%, $\Delta 2$ is equal to or larger than −0.05% and equal to or smaller than 0.05%, $|\Delta 3|$ is equal to or smaller than 0.25%, $\Delta 1 \times |\Delta 3|$ is equal to or smaller than $0.08\%^2$, an inner diameter of the trench layer is 2b, and an outer diameter of the trench layer is 2c.

8 Claims, 3 Drawing Sheets

(51) Int. Cl.
*C03B 37/027* (2006.01)
*G02B 6/02* (2006.01)
*G02B 6/036* (2006.01)

(52) U.S. Cl.
CPC ........ *C03B 37/027* (2013.01); *G02B 6/02214* (2013.01); *C03B 2201/12* (2013.01); *C03B 2201/31* (2013.01); *C03B 2203/22* (2013.01)

(56) References Cited

U.S. PATENT DOCUMENTS

| | | |
|---|---|---|
| 2007/0147756 A1 | 6/2007 | Matsuo et al. |
| 2008/0056654 A1 | 3/2008 | Bickham et al. |
| 2008/0152288 A1 | 6/2008 | Flammer et al. |
| 2008/0279515 A1 | 11/2008 | Bickham et al. |
| 2009/0263092 A1 | 10/2009 | Flammer et al. |
| 2010/0046899 A1 | 2/2010 | Bickham et al. |
| 2010/0166373 A1 | 7/2010 | Nakanishi et al. |
| 2012/0237174 A1 | 9/2012 | Nakanishi et al. |
| 2013/0094825 A1 | 4/2013 | Konishi et al. |
| 2013/0272669 A1 | 10/2013 | Oyamada et al. |
| 2013/0287352 A1 | 10/2013 | Oyamada |
| 2014/0248026 A1 | 9/2014 | Yang et al. |
| 2017/0131468 A1 | 5/2017 | Kawaguchi et al. |

FOREIGN PATENT DOCUMENTS

| | | | |
|---|---|---|---|
| JP | 2008-139887 A | 6/2008 | |
| JP | 2010-503019 A | 1/2010 | |
| JP | 2010-181641 A | 8/2010 | |
| JP | 2010-526749 A | 8/2010 | |
| JP | 2011-203552 A | 10/2011 | |
| JP | 4833071 B2 | 12/2011 | |
| JP | 2012-212115 A | 11/2012 | |
| JP | 2013-235261 A | 11/2013 | |
| JP | 2013-242545 A | 12/2013 | |
| WO | WO 2004/092794 A1 | 10/2004 | |
| WO | WO 2009/104724 A1 | 8/2009 | |
| WO | WO 2010/093187 A2 | 8/2010 | |
| WO | WO-2010093187 A2 * | 8/2010 | .......... G02B 6/0365 |
| WO | WO 2016/031901 A1 | 3/2016 | |
| WO | WO 2018/138736 A2 | 8/2018 | |

OTHER PUBLICATIONS

Notice of Reasons for Rejection dated Jul. 20, 2021 in corresponding Japanese Application No. 2019-020946, 10 pages (with English translation).

Extended European Search Report dated Sep. 20, 2022 in European Patent Application No. 20752007.3, 8 pages.

* cited by examiner

OPTICAL FIBER AND METHOD OF MANUFACTURING OPTICAL FIBER

CROSS-REFERENCE TO RELATED APPLICATION(S)

This application is a continuation of International Application No. PCT/JP2020/002357, filed on Jan. 23, 2020 which claims the benefit of priority of the prior Japanese Patent Application No. 2019-020946, filed on Feb. 7, 2019, the entire contents of which are incorporated herein by reference.

BACKGROUND

The present disclosure relates to an optical fiber and a method of manufacturing the optical fiber.

BACKGROUND

In the related art, to realize a single-mode optical fiber with low bending loss characteristics as defined by, for example, International Telecommunication Union-Telecommunication sector (ITU-T) G.657.A2 or the like, an optical fiber having a three-layer structure including a trench structure has been disclosed (Japanese Patent No. 4833071, and Japanese Laid-open Patent Publication Nos. 2008-139887, 2010-181641, 2012-212115, 2013-242545, and 2013-235261). The optical fiber having the three-layer structure includes, for example, a central core portion, an intermediate layer that is formed on an outer periphery of the central core portion, a trench layer that is formed on an outer periphery of the intermediate layer, and a cladding portion that is formed on an outer periphery of the trench layer.

SUMMARY

There is a need for providing an optical fiber that has low bending loss characteristics and high manufacturability and a method of manufacturing the optical fiber.

According to an embodiment, an optical fiber includes: a central core portion; an intermediate layer that is formed on an outer periphery of the central core portion; a trench layer that is formed on an outer periphery of the intermediate layer; and a cladding portion that is formed on an outer periphery of the trench layer. Further, relationships $\Delta 1 > \Delta 2 > \Delta 3$ and $0 > \Delta 3$ are satisfied, where $\Delta 1$ is a relative refractive-index difference of the central core portion with respect to the cladding portion, $\Delta 2$ is a relative refractive-index difference of the intermediate layer with respect to the cladding portion, and $\Delta 3$ is a relative refractive-index difference of the trench layer with respect to the cladding portion, and (c−b) is smaller than 4.5 µm when $\Delta 1$ is equal to or larger than 0.36% and equal to or smaller than 0.40%, $\Delta 2$ is equal to or larger than −0.05% and equal to or smaller than 0.05%, $|\Delta 3|$ is equal to or smaller than 0.25%, $\Delta 1 \times |\Delta 3|$ is equal to or smaller than $0.08\%^2$, an inner diameter of the trench layer is 2b, and an outer diameter of the trench layer is 2c.

DETAILED DESCRIPTION

Optical characteristics of the optical fiber having the three-layer structure are designed by setting structural parameters, such as a relative refractive-index difference $\Delta 1$ of the central core portion, a relative refractive-index difference $\Delta 2$ of the intermediate layer, a relative refractive-index difference $\Delta 3$ of the trench layer, a core diameter 2a of the central core portion, an inner diameter 2b of the trench layer (in other words, an outer diameter of the intermediate layer), and an outer diameter 2c. Meanwhile, in general, $\Delta 3$ is a negative value and $\Delta 2$ is a value smaller than $\Delta 1$. In Patent Literatures 1 to 6, various combinations of values of the structural parameters as described above are disclosed.

However, even in the disclosed optical fibers, there is room for improvement from the standpoint of manufacturability. For example, if $\Delta 1$ is designed to be high, a use amount of a dopant for improving a refractive index at the time of manufacturing increases. Similarly, if an absolute value of $\Delta 3$ is designed to be high or a width of the intermediate layer (a difference between the outer diameter and the inner diameter) is designed to be high, a use amount of a dopant for reducing a refractive index at the time of manufacturing increases. In contrast, particularly with regard to $\Delta 1$, if $\Delta 1$ is designed to be extremely low, it is necessary to precisely control the use amount of the dopant and an influence of disturbance increases, so that a manufacturing error may increase.

Embodiments of the present disclosure will be described in detail below with reference to the drawings. The present disclosure is not limited by the embodiments described below. Further, in each of the drawings, the same or corresponding structural elements are appropriately denoted by the same reference symbols, and explanation of the structural elements will be omitted appropriately. Furthermore, in the present specification, a cutoff wavelength is an effective cutoff wavelength and indicates a cable cutoff wavelength that is defined by International Telecommunication Union-Telecommunication sector ITU-T G.650.1. Moreover, other terms that are not specifically defined in the present specification conform to definitions and measurement methods described in G.650.1 and G.650.2.

First Embodiment

Figure 1:
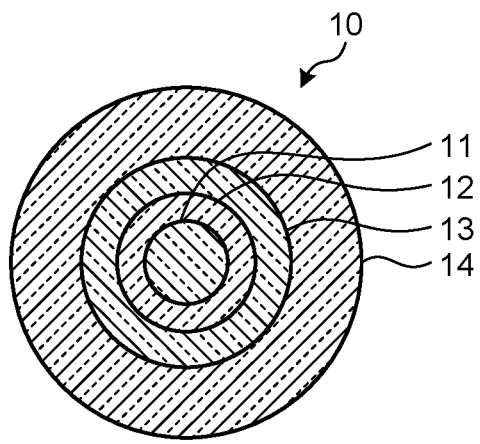
FIG. 1 is a schematic cross-sectional view of an optical fiber according to a first embodiment.

FIG. 1 is a schematic cross-sectional view of an optical fiber according to a first embodiment. An optical fiber 10 is made of silica based glass, and includes a central core portion 11, an intermediate layer 12 that is formed on an outer periphery of the central core portion 11, a trench layer 13 that is formed on an outer periphery of the intermediate layer 12, and a cladding portion 14 that is formed on an outer periphery of the trench layer 13.

Figure 2:
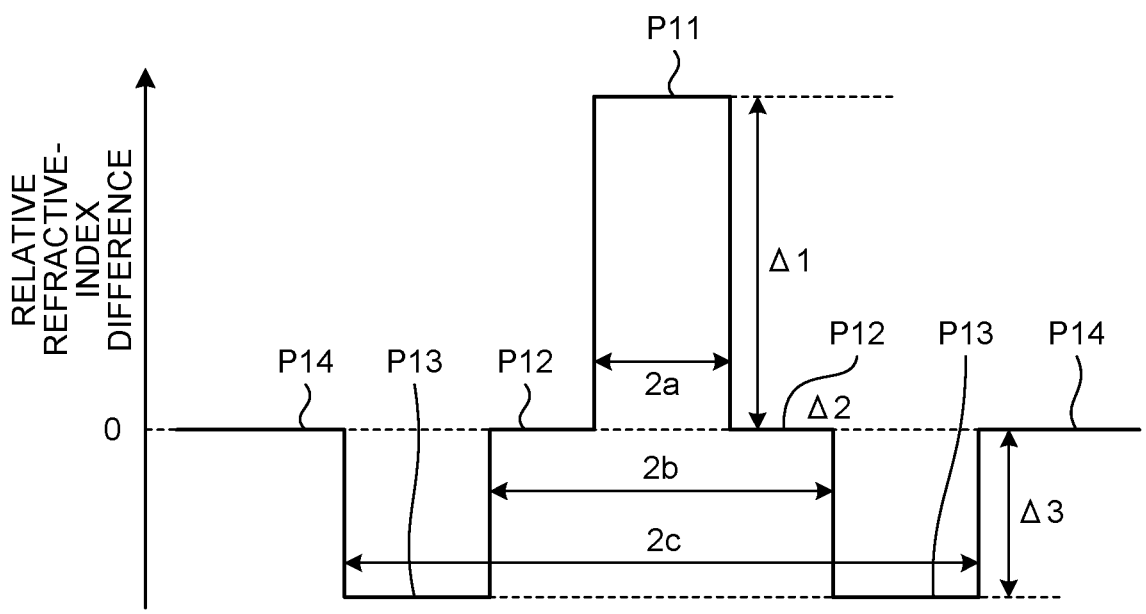
FIG. 2 is a diagram illustrating a refractive index profile of the optical fiber illustrated in FIG. 1.
Figure 3:
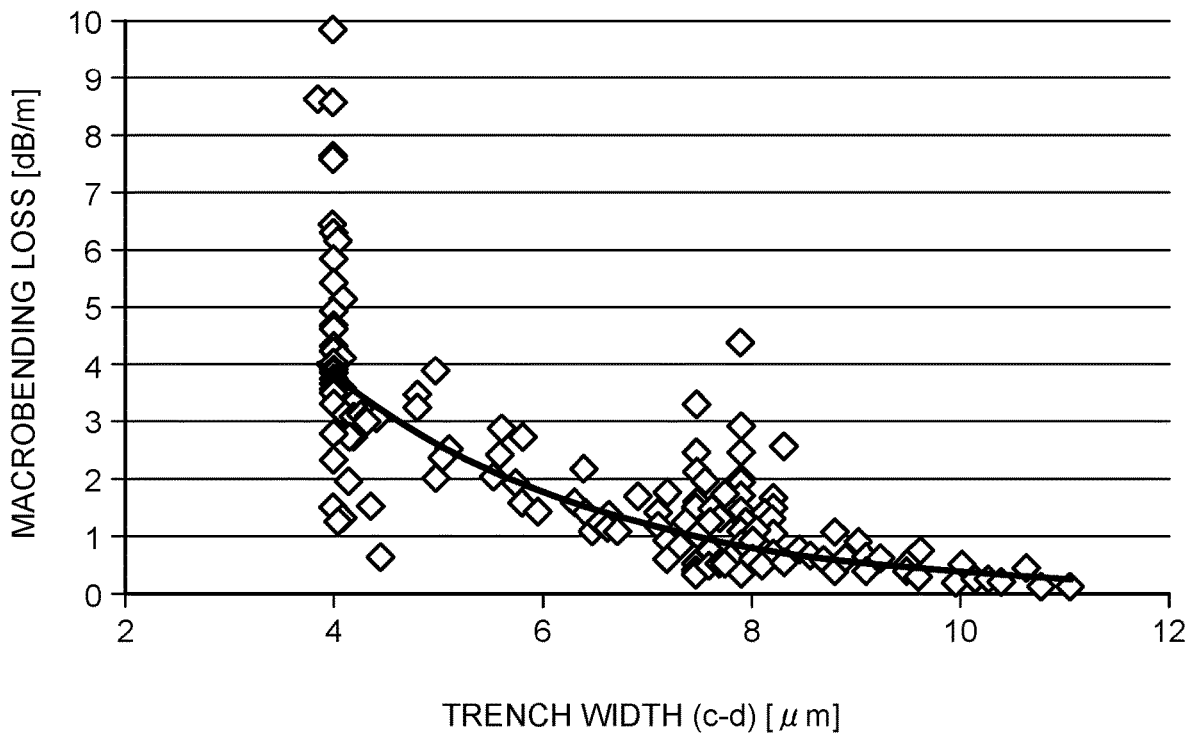
FIG. 3 is a diagram illustrating a relationship between a trench width (c−b) and a macrobending loss.

FIG. 2 is a diagram illustrating a refractive index profile of the optical fiber 10. A profile P11 is a refractive index profile of the central core portion 11 and is what called a center-core-portion type. A profile P12 is a refractive index profile of the intermediate layer 12. A profile P13 is a refractive index profile of the trench layer 13. A profile P14 is a refractive index profile of the cladding portion 14.

Structural parameters of the optical fiber 10 will be described. First, a core diameter of the central core portion 11 is 2a. Further, an outer diameter of the intermediate layer 12, that is, an inner diameter of the trench layer 13 is 2b, and an outer diameter of the trench layer 13 is 2c. Therefore, a width (trench width) of the trench layer 13 is (c−b). Furthermore, a relative refractive-index difference of a maximum refractive index of the central core portion 11 with respect to a refractive index of the cladding portion 14 is Δ1. A relative refractive-index difference of a refractive index of the intermediate layer 12 with respect to the refractive index of the cladding portion 14 is Δ2. A relative refractive-index difference of a refractive index of the trench layer 13 with respect to the refractive index of the cladding portion 14 is Δ3. As for Δ1, Δ2, and Δ3, Δ1>Δ2>Δ3 and 0>Δ3. In other words, Δ3 is a negative value, and therefore, the trench layer 13 is able to improve the low bending loss characteristics of the optical fiber 10.

Examples of constituent materials of the optical fiber 10 will be described below. The central core portion 11 is made of silica glass doped with a dopant, such as germanium (Ge), for adjusting the refractive index to improve the refractive index. The trench layer 13 is made of silica glass doped with a dopant, such as fluorine (F), for reducing the refractive index. The cladding portion 14 is made of pure silica glass that does not contain a dopant, such as Ge or F, for adjusting the refractive index. The intermediate layer 12 may be made of pure silica glass or may be doped with a certain amount of a dopant for adjusting the refractive index. However, the constituent materials and the dopants are not specifically limited as long as inequalities with respect to al, Δ2, and Δ3 as described above are true.

In the optical fiber 10, with regard to Δ1, Δ2, Δ3, and the trench width (c−b), Δ1 is equal to or larger than 0.36% and equal to or smaller than 0.40%, 13 that is an absolute value of Δ3 is equal to or smaller than 0.25%, Δ1×|Δ3| is equal to or smaller than 0.08%$^2$, and the trench width (c−b) is smaller than 4.5 μm. Further, Δ2 is equal to or larger than −0.05% and equal to or smaller than 0.05%. In this manner, if Δ1 is equal to or larger than 0.36% and equal to or smaller than 0.40%, it is possible to reduce the use amount of the dopant for improving the refractive index at the time of manufacturing, it is possible to easily control the use amount of the dopant, and it is possible to relatively increase strength against disturbance, so that it is possible to reduce a manufacturing error. Furthermore, if |Δ3| is equal to or smaller than 0.25% and the trench width (c−b) is smaller than 4.5 μm, it is possible to reduce the use amount of the dopant for reducing the refractive index. Moreover, if the trench width (c−b) is smaller than 4.5 μm, it is possible to set the trench width (c−b) and a core radius of the central core portion 11 to approximately the same value, so that it is possible to easily adopt a manufacturing condition with reference to a manufacturing condition of the central core portion and it is possible to simplify manufacturing. Furthermore, if Δ1×|Δ3| is equal to or smaller than 0.08%$^2$, it is possible to effectively improve an effect of reduction of the use amounts of the dopants, an effect of simplicity of control, and an effect of reduction of the manufacturing error, so that it is possible to improve manufacturability of the optical fiber 10.

As for |Δ3|, if |Δ3| is smaller than 0.25%, in particular, if |Δ3| is equal to or smaller than 0.20%, it is possible to further reduce the use amount of the dopant. Further, if |Δ3| is equal to or larger than 0.10%, it is possible to easily control the use amount of the dopant and it is possible to reduce the manufacturing error. As a result, it is possible to further improve the manufacturability of the optical fiber 10.

Meanwhile, if |Δ3| is equal to or larger than 0.10%, Δ1×|Δ3| is equal to or larger than 0.034%$^2$. Therefore, it is preferable that Δ1×|Δ3| is equal to or larger than 0.034%$^2$.

While details will be described later, as examples of preferable ranges of the other structural parameters, b/a is equal to or larger than 1.8 and equal to or smaller than 3.6, for example. Further, 2a is equal to or larger than 7.5 μm and equal to or smaller than 9.0 μm.

By appropriately combining the values of the structural parameters as described above, the optical fiber 10 can have a mode field diameter (MFD) equal to or larger than 8.6 μm and equal to or smaller than 9.5 μm at a wavelength of 1310 nm, as will be described in detail later. Further, the optical fiber 10 can have an effective cutoff wavelength equal to or smaller than 1260 nm. Furthermore, the optical fiber 10 can have a bending loss equal to or smaller than 1.59 dB/m at a wavelength of 1550 nm when bending is made at a diameter of 20 mm (hereinafter, the bending loss at a wavelength of 1550 nm when bending is made at the diameter of 20 mm may be simply referred to as a macrobending loss). Moreover, the optical fiber 10 can have a zero-dispersion wavelength equal to or larger than 1300 nm and equal to or smaller than 1324 nm and have a dispersion slope equal to or smaller than 0.092 ps/nm$^2$/km at the zero-dispersion wavelength. As a result, it is possible to provide the optical fiber 10 that meets the standard defined by ITU-T G.652 (hereinafter, may be described as G.652 standard), for example. Furthermore, if the MFD is equal to or smaller than 9.2 μm, it is possible to provide the optical fiber 10 that meets G.657A standard, in particular, G.657 Δ2 standard. Meanwhile, the value of 1.59 dB/m of the macrobending loss is a converted value of 0.1 dB/turn in G.657 Δ2 standard. Moreover, it may be possible to appropriately combine the values of the structural parameters such that the effective cutoff wavelength is equal to or smaller than 1530 nm, which meets G.654 standard.

Figure 4:
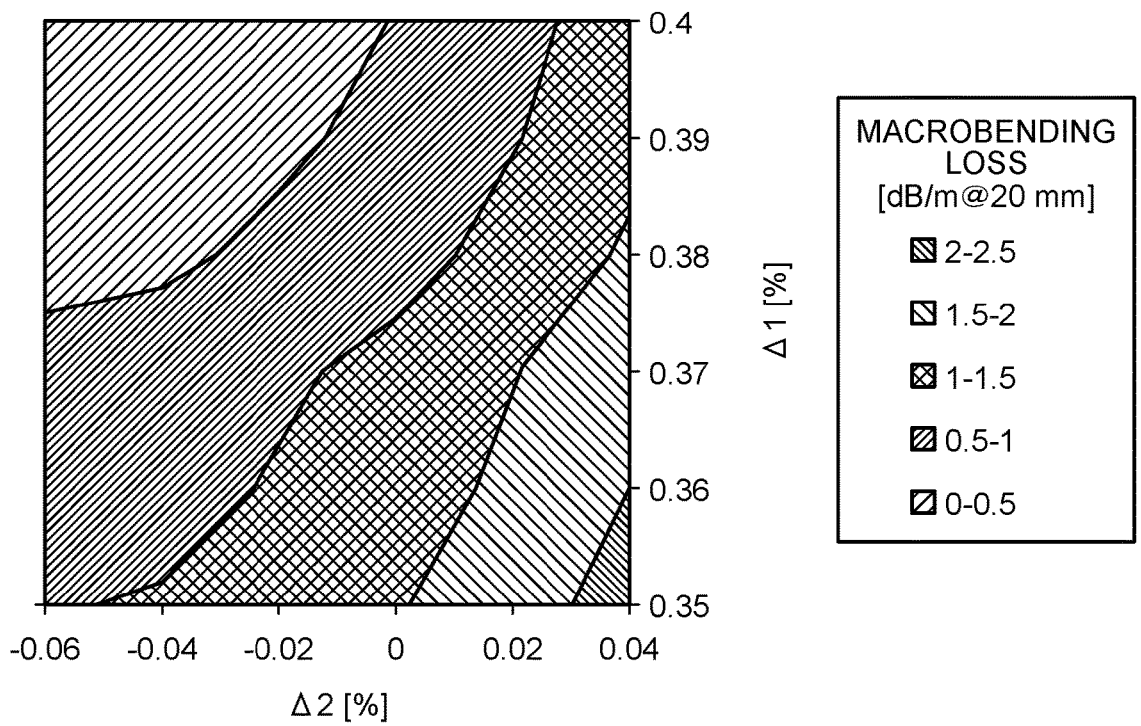
FIG. 4 is a diagram illustrating a relationship among $\Delta 1$, $\Delta 2$, and the macrobending loss.

Details will be described below using results of simulation calculation. FIG. 4 is a diagram illustrating a relationship between the trench width (c−b) and the macrobending loss based on the simulation calculation. Diamond shapes represent data points, and a solid line represents a curved line of approximation of the data points by an exponential function. The data points represent calculation results that are obtained by setting Δ1, Δ2, Δ3, a, b, and c, which are the structural parameters, to various values such that |Δ3| is equal to or smaller than 0.25%. To reduce the macrobending loss while maintaining |Δ3| equal to or smaller than 0.25%, a larger trench width (c−b) is preferable. Therefore, to realize the trench width (c−b) smaller than 4.5 μm, it is necessary to appropriately set the structural parameters.

FIG. 4 is a diagram illustrating a relationship among Δ1, Δ2, and the macrobending loss. In FIG. 4, average values of the macrobending loss that are obtained under certain conditions in which each of Δ3, (c−b), and b/a is changed such that |Δ3| is equal to or smaller than 0.25%, Δ1×|Δ3| is equal to or smaller than 0.08%$^2$, (c−b) is smaller than 4.5 μm, and b/a is equal to or larger than 1.8 and equal to or smaller than 3.6 are illustrated. As can be understood from FIG. 4, under certain conditions in which Δ1 is equal to or larger than 0.36% and equal to or smaller than 0.40% and Δ2 is equal to or larger than −0.05% and equal to or smaller than 0.05%, the macrobending loss is equal to or smaller than 1.59 dB/m in some cases. Meanwhile, in consideration of manufacturing variation, it is preferable to select a combination of the structural parameters such that the macrobending loss is equal to or smaller than 1.5 dB/m.

Meanwhile, as described above, FIG. 4 illustrates the average values of the macrobending loss, and therefore, even with a combination of Δ1 and Δ2 with which the macrobending loss is not equal to or smaller than 1.5 dB/m in FIG. 4, the macrobending loss may become equal to or smaller than 1.5 dB/m by optimization of the other structural parameters.

Figure 5:
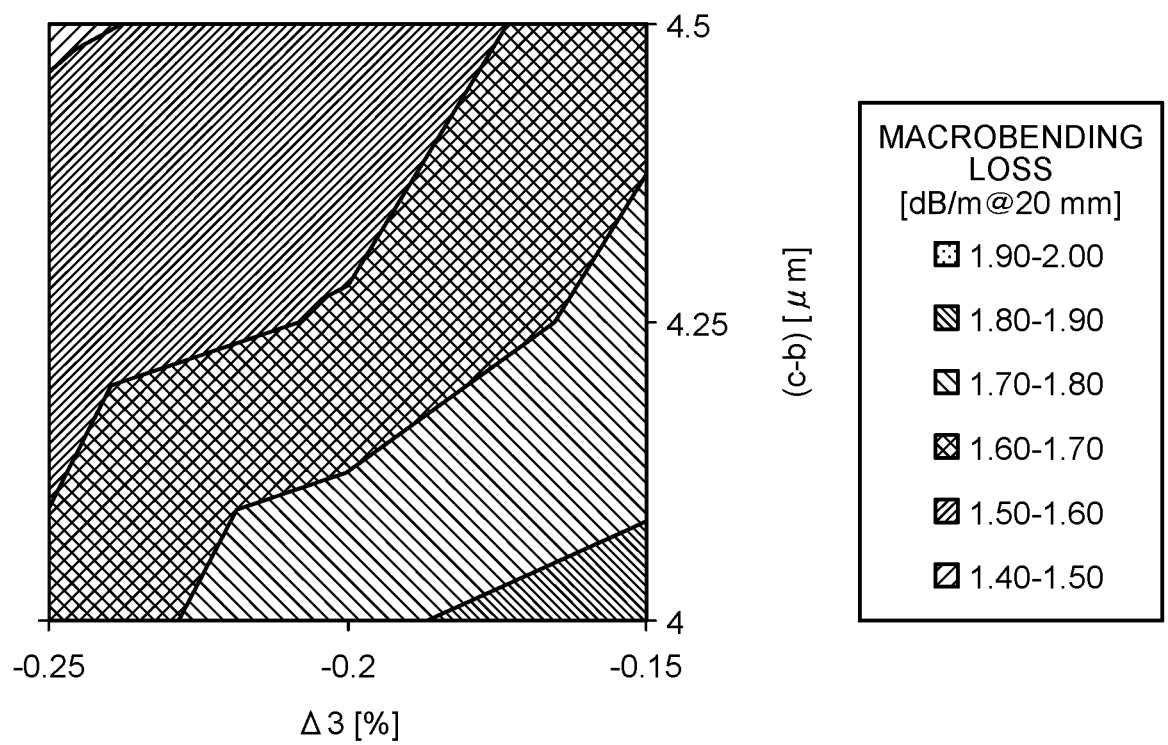
FIG. 5 is a diagram illustrating a relationship among $\Delta 3$, a trench width, and the macrobending loss.

For example, FIG. 5 is a diagram illustrating a relationship among Δ3, the trench width, and the macrobending loss. In FIG. 5, Δ1 is set to 0.36% and Δ2 is set to 0.02%. In FIG. 4, if Δ1 is 0.36% and Δ2 is 0.02%, the macrobending loss is 1.5 to 2 dB/m. However, as can be understood FIG. 5, even if Δ1 is 0.36% and Δ2 is 0.02%, by appropriately setting a combination of Δ3 and (c–b), the macrobending loss becomes equal to or smaller than 1.5 dB/m.

Further, through earnest examination, the present inventors confirmed that, with respect to the effective cutoff wavelength, the MFD, the zero-dispersion wavelength, and the dispersion slope, it is possible to realize characteristics that meet G.657 A2 standard or characteristics similar to characteristics that meet G.657 A2 standard as follows: the effective cutoff wavelength is equal to or smaller than 1260 nm, the MFD at a wavelength of 1310 nm is equal to or larger than 8.6 μm and equal to or smaller than 9.5 μm, the zero-dispersion wavelength is equal to or larger than 1300 nm and equal to or smaller than 1324 nm, and the dispersion slope at the zero-dispersion wavelength is equal to or smaller than 0.092 ps/nm$^2$/km under a condition in which Δ1 is equal to or larger than 0.36% and equal to or smaller than 0.40%, Δ2 is equal to or larger than –0.05% and equal to or smaller than 0.05%, |Δ3| is equal to or smaller than 0.25%, Δ1×|Δ3| is equal to or smaller than 0.08%$^2$, and (c–b) is smaller than 4.5 μm. Meanwhile, to realize the characteristics as described above, it is preferable that b/a is equal to or larger than 1.8 and equal to or smaller than 3.6 and 2a is equal to or larger than 7.5 μm and equal to or smaller than 9.0 μm, but b/a and 2a are not limited to the ranges as described above.

Changes of the optical characteristics of the optical fiber 10 when several structural parameters are changed will be described in detail below using results of simulation calculation. First, changes of the optical characteristics were calculated with respect to structural parameter combinations indicated by No. 1 to No. 8 in Table 1. In No. 1 to No. 8, Δ1 was changed in a range of 0.36% to 0.40%. Δ2 was changed in a range of –0.05% to 0.05%. |Δ3| was changed in a range of 0.2% to 0.22% and Δ1×|Δ3| was changed in a range of 0.08%$^2$ to 0.074%$^2$. b/a was changed in a range of 1.8 to 3.6. 2a was changed in a range of 7.9 μm to 8.8 μm. (c–b) was changed in a range of 2.87 μm to 4.46 μm.

TABLE 1

|  | Δ1 [%] | Δ2 [%] | Δ3 [%] | Δ1 × |Δ3| [%$^2$] | b/a | 2a [μm] | c-b [μm] |
| --- | --- | --- | --- | --- | --- | --- | --- |
| No. 1 | 0.39 | 0 | –0.20 | 0.0780 | 3.0 | 8.2 | 4.10 |
| No. 2 | 0.37 | –0.05 | –0.20 | 0.0740 | 3.0 | 8.7 | 4.35 |
| No. 3 | 0.40 | 0 | –0.20 | 0.0800 | 3.3 | 8.2 | 2.87 |
| No. 4 | 0.36 | –0.05 | –0.20 | 0.0792 | 3.0 | 8.8 | 4.40 |
| No. 5 | 0.40 | 0.02 | –0.20 | 0.0800 | 3.0 | 7.9 | 4.15 |
| No. 6 | 0.39 | 0 | –0.20 | 0.0800 | 2.1 | 8.2 | 4.46 |
| No. 7 | 0.39 | 0 | –0.20 | 0.0780 | 1.8 | 8.4 | 4.18 |
| No. 8 | 0.38 | 0 | –0.20 | 0.0760 | 3.6 | 8.2 | 4.43 |

Table 2 lists values of the zero-dispersion wavelength, the dispersion slope, the MFD, the cutoff wavelength, and the macrobending loss among the optical characteristics, as results of simulation calculation performed with respect to No. 1 to No. 8. Meanwhile, in Table 2, standard values of G.657 A2 standard are listed as a standard. As can be understood from Table 1 and Table 2, it was confirmed that the result of the simulation calculation with respect to each of No. 1 to No. 8 met G.657 A2 standard.

TABLE 2

|  | Zero-dispersion wavelength [nm] | Dispersion slope [ps/nm$^2$/km] @zero-dispersion wavelength | MFD [μm] @1310 nm | Cutoff wavelength [nm] @22 m | Macro-bending loss [dB/m @20 mm] @1550 nm |
| --- | --- | --- | --- | --- | --- |
| G.657 A2 standard | 1300–1324 | ≤0.092 | 8.6–9.2 | ≤1260 | ≤1.59 |
| No. 1 Simulation | 1312 | 0.088 | 8.68 | 1256 | 1.31 |
| No. 2 Simulation | 1301 | 0.090 | 8.71 | 1246 | 1.52 |
| No. 3 Simulation | 1312 | 0.087 | 8.62 | 1259 | 1.57 |
| No. 4 Simulation | 1300 | 0.090 | 8.82 | 1249 | 1.12 |
| No. 5 Simulation | 1320 | 0.087 | 8.63 | 1259 | 1.58 |
| No.6 Simulation | 1306 | 0.091 | 8.64 | 1252 | 1.56 |
| No. 7 Simulation | 1300 | 0.092 | 8.60 | 1245 | 1.58 |
| No. 8 Simulation | 1316 | 0.086 | 8.71 | 1256 | 1.28 |

Meanwhile, the optical fiber 10 according to the present embodiment can be manufactured by a well-known manufacturing method that includes a process of manufacturing an optical fiber preform and a process of manufacturing the optical fiber by heating and melting the optical fiber preform and performing drawing. In this case, the optical fiber preform includes portions that serve as the central core portion 11, the intermediate layer 12, the trench layer 13, and the cladding portion 14 of the optical fiber 10. The optical fiber preform can be manufactured by using a vapor phase axial deposition (VAD) method, a modified chemical vapor deposition (MCVD) method, a plasma chemical vapor deposition (PCVD) method, a sol-gel method or the like. For example, it is possible to manufacture the optical fiber preform by forming portions that serve as the central core portion 11, the intermediate layer 12, the trench layer 13, and a part of the cladding portion 14 of the optical fiber 10 by using the VAD method, and thereafter forming a glass layer that serves as remaining portions of the cladding portion 14 by using an outside vapor deposition (OVD) method, for example.

Table 3 lists measurement results of the optical characteristics of sample optical fibers that were manufactured by manufacturing optical fiber preforms by using the VAD method and the OVD method, and further performing drawing on the optical fiber preforms. Meanwhile, the sample optical fibers indicated by No. 1 and No. 2 were designed such that the combinations of the structural parameters indicated by No. 1 and No. 2 in Table 1 were obtained. As a result, it was confirmed that each of the sample optical fibers No. 1 and No. 2 met G.657 A2 standard with respect to the zero-dispersion wavelength, the dispersion slope, the MFD, the cutoff wavelength, and the macrobending loss, and the transmission loss was equal to or smaller than 0.2 dB/km, which was good. Further, it was confirmed that, with regard to the zero-dispersion wavelength, the dispersion slope, the MFD, the cutoff wavelength, and the macrobending loss, the optical characteristics obtained through the simulation calculation indicated by No. 1 and No. 2 listed in Table 2 and the optical characteristics of the sample optical fibers No. 1 and No. 2 almost matched with each other.

TABLE 3

| | Zero-dispersion wavelength [nm] | Dispersion slope [ps/nm$^2$/km] @ zero-dispersion wavelength | MFD [μm] @1310 nm | Cutoff wavelength [nm] @ 22 m | Macrobending loss [dB/m @ 20 mm] @ 1550 nm | Transmission loss [dB/km] @ 1550 nm |
|---|---|---|---|---|---|---|
| G.657 A standard | 1300-1324 | ≤0.092 | 8.6-9.2 | ≤1260 | ≤1.59 | |
| No. 1 sample | 1310 | 0.089 | 8.64 | 1251 | 1.18 | 0.199 |
| No. 2 Sample | 1303 | 0.091 | 8.73 | 1248 | 1.47 | 0.196 |

Meanwhile, the present disclosure is not limited by the embodiment as described above. The present disclosure includes a configuration in which the structural elements as described above are appropriately combined. Further, additional advantages and modifications will readily occur to those skilled in the art. Therefore, the disclosure in its broader aspects is not limited to the embodiment as described above, and various modifications may be made.

INDUSTRIAL APPLICABILITY

An optical fiber according to the present disclosure is preferably useful in the field of optical communication, such as data communication or telecommunication.

According to the present disclosure, it is possible to realize an optical fiber that has low bending loss characteristics and high manufacturability.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An optical fiber comprising:
a central core portion;
an intermediate layer that is formed on an outer periphery of the central core portion;
a trench layer that is formed on an outer periphery of the intermediate layer; and
a cladding portion that is formed on an outer periphery of the trench layer, wherein
relationships Δ1>Δ2>Δ3 and 0>Δ3 are satisfied, where Δ1 is a relative refractive-index difference of the central core portion with respect to the cladding portion, Δ2 is a relative refractive-index difference of the intermediate layer with respect to the cladding portion, and Δ3 is a relative refractive-index difference of the trench layer with respect to the cladding portion, and
(c−b) is smaller than 4.5 μm when Δ1 is equal to or larger than 0.37% and equal to or smaller than 0.40%, Δ2 is equal to or larger than −0.05% and equal to or smaller than 0.05%, |Δ3| is equal to or smaller than 0.25%, Δ1×|Δ3| is equal to or smaller than 0.0792%$^2$, an inner diameter of the trench layer is 2b, and an outer diameter of the trench layer is 2c,
b/a is equal to or larger than 1.8 and equal to or smaller than 3.6 when a core dimeter of the central core portion is 2a and the inner dimeter of the trench layer is 2b and,
2a is equal to or larger than 7.5 μm and equal to or smaller than 9.0 μm when a core diameter of the central core portion is 2a.

2. The optical fiber according to claim 1, wherein 2a is equal to or larger than 7.9 μm and equal to or smaller than 8.8 μm.

3. The optical fiber according to claim 1, wherein an effective cutoff wavelength is equal to or smaller than 1260 nm.

4. The optical fiber according to claim 1, wherein a mode field diameter at a wavelength of 1310 nm is equal to or larger than 8.6 μm and equal to or smaller than 9.5 μm.

5. The optical fiber according to claim 1, wherein a bending loss at a wavelength of 1550 nm when bending is made at a diameter of 20 mm is equal to or smaller than 1.59 dB/m.

6. The optical fiber according to claim 1, wherein
a zero-dispersion wavelength is equal to or larger than 1300 nm and equal to or smaller than 1324 nm, and
a dispersion slope at the zero-dispersion wavelength is equal to or smaller than 0.092 ps/nm$^2$/km.

7. The optical fiber according to claim 1, wherein Δ1×|Δ3| is equal to or larger than 0.034%.

8. The optical fiber according to claim 1, wherein (c−b) is equal to or larger than 4.1 μm.

* * * * *